United States Patent [19]

Keuper et al.

[11] 3,940,647

[45] Feb. 24, 1976

[54] SLOT CLOSURE FOR DYNAMOELECTRIC MACHINE

[75] Inventors: John J. Keuper, Cold Spring, Ky.; Virgil R. Scardina, Milford; Paul D. Wagner, Cincinnati, both of Ohio

[73] Assignee: Allis-Chalmers Corporation, Milwaukee, Wis.

[22] Filed: Nov. 27, 1974

[21] Appl. No.: 527,810

[52] U.S. Cl. ............................................. 310/214
[51] Int. Cl.² ......................................... H02K 3/48
[58] Field of Search ........... 310/214, 215, 216, 217, 310/218, 66, 42, 259, 261

[56] References Cited
UNITED STATES PATENTS

| | | | |
|---|---|---|---|
| 941,181 | 11/1909 | Young | 310/214 |
| 990,180 | 4/1911 | Young | 310/214 |
| 2,745,030 | 5/1956 | Baldwin | 310/214 |
| 3,009,073 | 11/1961 | Drabik | 310/214 |
| 3,519,861 | 6/1970 | Walker | 310/214 |
| 3,735,169 | 5/1973 | Balke | 310/215 |

*Primary Examiner*—R. Skudy
*Attorney, Agent, or Firm*—John P. Hines

[57] ABSTRACT

A closure for securing conductor bars in the coil slots of a dynamoelectric machine consisting of a U-shaped clip which is inserted into the coil slots over the conductor with the legs of the clip extending between the sides of the conductor and the winding slot. Spring-like tabs which, in the preferred embodiment, are the lower portion of the legs bent upward, snap into longitudinal grooves provided in the side walls of the conductor slot when the top portion of the U-shaped clip contacts the top of the coil sides. This permits insertion of the slot closure from the top of the slot by merely pushing downward until the tabs snap into the side grooves.

6 Claims, 3 Drawing Figures

SLOT CLOSURE FOR DYNAMOELECTRIC MACHINE

This invention pertains in general to dynamoelectric machines and more particularly to means for retaining the conductor bars or coil sides of such machine rotors and stators fixed within their winding slots.

Various means have in the past been employed to retain the coils of motors and other electrical equipment fixed within the slots of rotors or stators, such means being known commonly as slot wedges or closures which usually take the form of flat pieces of glass, fabric, wood, fiber, paper and the like. In some instances, such wedges are made in the form of channels which, after implacement of the coil sides, are slid through the slot over the coil side to prevent migration of the coil out of the slots before vanish treatment of the windings and later during operation of the machine. In some instances the wedging function is combined with the so-called slot cells which may be in the form of sheet insulation which serves to line the complete slot.

These known modes for securing the conductors in the motor slots do not, in many instances, permit locating the tops of the conductors very close to the gap between the stator and rotor. This is usually due to the thickness of the wedges and the height of the attachment means of the wedges to the slot. Consequently, the conductors remain recessed in the stator or rotor slots relatively far away from the inner surface of the gap between the stator and rotor.

When current flows through the conductors, a fairly large number of flux lines is formed directly around the conductors without traversing the air gap and consequently without producing a flux linkage with the conductors of the other motor element. This results in a rather high value of leakage reactance. In certain cases of alternating current machines were particular operating conditions are sought, it can be useful to reduce the leakage reactance to a small value. For this it is necessary to bring the conductors as near as possible to the zone where the energy exchange occurs, i.e. at the gap between the rotor and the stator.

Furthermore, heat dissipation can be a problem if the slot wedge causes the top of the conductor bar to be spaced any significant distance from the air gap. Considerably more heat can be dissipated by positioning the conductor bar as close to the air gap as possible and by exposing the conductor bar to the air gap.

It is the intention and general object of this invention to provide a slot closure which permits location of the conductor bars very close to the air gap.

An additional object of the subject invention is to provide a slot closure which can be inserted into holding engagement with the coil from the top of the coil slot as opposed to the end of the coil slot.

A further object of the subject invention is to provide a slot closure of the hereinbefore described type which can be of any desired length and which permits the utilization of a plurality of axially spaced slot closures.

A more specific object of the subject invention is to provide a slot closure of the hereinbefore described type which is U-shaped in cross section having the lower leg portions thereof bent up and outwardly to form tabs which engage the side walls of the slot to resist upward movement of the coil sides after the closure has been forced down over the conductor bar.

A further object of the subject invention is to provide a slot closure of the hereinbefore described type wherein a groove is provided in the side wall of the coil slot below the outer end of the conductor bar into which groove the closure tabs spring upon insertion of the closure into the coil slot.

An additional specific object of the subject invention is to provide a slot closure of the hereinbefore described type wherein the midsection of the top portion of the slot closure is removed to permit additional surface of the coil side to be exposed to the air gap.

These and other objects of the subject invention will become more fully apparent as the following description is read in light of the attached drawing wherein.

Figure 2:
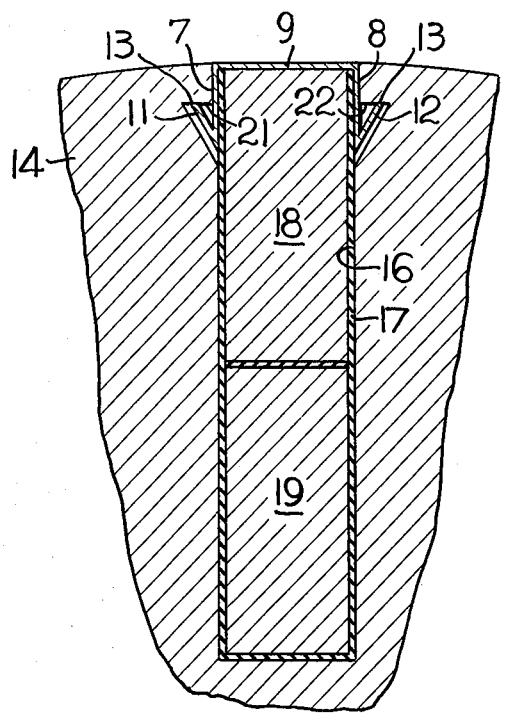
FIG. 2 is a sectional view of a dynamoelectric machine including the slot closure of FIG. 1 in place.
Figure 1:
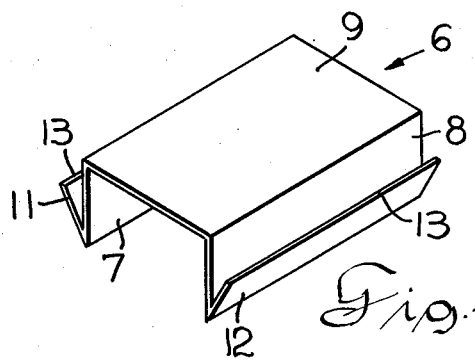
FIG. 1 is an isometric view of one modification of slot closure of the subject invention.

Referring to the drawing wherein like reference characters refer to the same or similar elements, 6 refers generally to the preferred form of slot closure. The slot closure is generally U-shaped in cross section having a pair of spaced legs 7 and 8 connected together by a top portion 9. Upwardly and outwardly extending tabs 11 and 12 are attached to each leg. In actual construction these tabs 11 and 12 are formed by bending the lower portions of the legs 7 and 8 upwardly. Each tab 11 and 12 includes a terminal end edge 13 facing upward toward the top portion 9.

The slot closure 6 may be constructed of any material or combination of material depending on the particular type of motor involved such as spring steel, aluminum or a plastic material. Regardless of the type of material utilized, the tabs 11 and 12 must be sufficiently resilient so that they can be compressed into engagement with the coil slot side walls 16 and then spring outward when released as will be later apparent.

Referring to FIG. 2, an element of dynamoelectric machine such as a rotor 14 is shown. The rotor is provided with a plurality of coil slots 16. A slot liner 17 is provided in the winding slot and into this is placed the coil sides or conductor bars 18 and 19. In the preferred embodiment, a pair of longitudinally extending grooves 21 and 22 are provided on the inner surface side walls of the coil slots 16.

Once the coil sides are in place, the slot closure 6 is inserted from the top of the coil slot 16 until the tabs 11 and 12 spring into the grooves 21 and 22 respectively. The location of the grooves 21 and 22 relative to the top of the coil side 18 is arranged to insure that the top portion 9 of the slot closure 6 engages the top of the coil side 18 when the tabs 11 and 12 spring into the grooves 21 and 22. Depending on the size of the dynamoelectric machine and the holding force necessary, one or more axially spaced slot closures would be employed.

Figure 3:
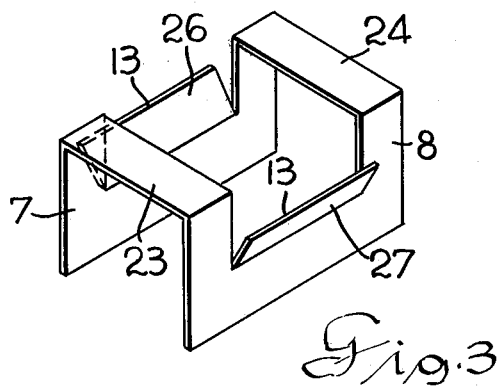
FIG. 3 is an isometric view of a modified form of slot closure.

A modified form of slot closure is shown in FIG. 3. With this slot closure the midsection is removed resulting in a pair of spaced top portions 23 and 24. With this arrangement the top of the coil side 18 between the pair of top portions 23 and 24 is exposed to the air gap. Furthermore, in the modification shown in FIG. 3, the tabs 26 and 27 are formed by cutting out a portion of the legs 7 and 8 and bending the remaining midsections outwardly.

It should be understood that in the event that the slot closures are made of a spring steel material, it may be possible to utilize the invention without employing grooves 21 and 22. If the tabs are sufficiently sharp and of sufficient strength, when inserted in the coil slot 16, they will resist withdrawal from the top of the coil slot by biting or gouging into the side walls of the coil slot.

From the above description it can be seen that an inexpensive slot closure has been provided which permits insertion of the slot closure from the top of the coil slot as opposed to the end of the coil slot. This permits the utilization of only that number of slot closures which are necessary to adequately retain the coil sides. By axially spacing the slot closures, additional surface of the coil side is exposed to the air gap thus resulting in improved cooling of the coils. The modification of slot closure disclosed in FIG. 3 permits additional surface of the coil side to be exposed to the air gap. Furthermore, by providing that the end edge surface 13 of the slot closure terminates short of the top portion 9 of the closure, ample holding engagement can be maintained with the side walls of the coil slot 16 while at the same time permitting the coil side to terminate closely adjacent to the air gap. That is, the thickness of the top portion 9 determines the distance the coil side is spaced from the air gap and not the location of the grooves 21 and 22.

The embodiments of the invention of which an exclusive property or privelege is claimed are defined as follows:

1. A slot closure for a dynamoelectric machine adapted to be positioned in a coil slot having side walls and a radially facing open end to hold the machine coil sides in place comprising: a substantially inverted U-shaped body portion having a pair of legs spaced apart a distance substantially equal to the width of said coil slot and connected together by a top portion; and a pair of outwardly disposed tabs connected to the outside of said legs having terminal end edges facing upwardly toward said top portion and when not inserted in said slot being spaced apart a distance greater than the normal width of said slot, said tabs being resilient and capable of being compressed to the width of said coil slot without losing their resiliency, said slot closure being insertable downwardly into said slot from said open end with the legs straddling the coil sides and the tabs being compressed by the slot side walls until the top portion engages the top of said coil side, said terminal end edges of said tabs engaging said side walls to prohibit removal of said slot closure upwardly from said open end of said coil slot.

2. The slot closure set forth in claim 1 wherein said tabs are constructed of spring steel and gouge into said side walls to hold said slot closure in position.

3. The slot closure set forth in claim 1 wherein the midsection of said top portion is cut out exposing the top of said coil side.

4. The slot closure set forth in claim 1 and further comprising a longitudinal groove in said coil slot side walls, said tabs snapping into said grooves to hold said closure in place when said top portion engages the top of said coil side.

5. The slot closure set forth in claim 4 wherein the midsection of said top portion is cut out exposing the top of said coil side.

6. A slot closure adapted to be positioned in a dynamoelectric machine coil slot having side walls and a radially facing open end to hold the machine coil sides in place comprising a substantially inverted U-shaped body portion having a pair of legs spaced apart a distance substantially equal to the width of said coil slot and connected together by a pair of longitudinally spaced top portions, the upper portions of said legs between said top portions being bent outward and having terminal end edges facing upwardly toward said top portion and when not inserted in said slot being spaced apart a distance greater than the normal width of said slot, said upper leg portions being resilient and capable of being compressed to the width of said coil slot without losing their resiliency, said slot closure being insertable downwardly into said slot from said open end with the legs straddling the coil side and the upper leg portions being compressed by the slot side walls, said terminal end edges engaging said side walls to prohibit removal of said slot closure upwardly from said open end of said coil slot.

* * * * *